US012246711B2

(12) United States Patent
Kaminade et al.

(10) Patent No.: US 12,246,711 B2
(45) Date of Patent: Mar. 11, 2025

(54) DRIVING SUPPORT DEVICE

(71) Applicant: TOYOTA JIDOSHA KABUSHIKI KAISHA, Toyota (JP)

(72) Inventors: Takuya Kaminade, Okazaki (JP); Masaki Ikai, Toyota (JP); Masashi Oishi, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 18/103,083

(22) Filed: Jan. 30, 2023

(65) Prior Publication Data

US 2023/0249682 A1 Aug. 10, 2023

(30) Foreign Application Priority Data

Feb. 4, 2022 (JP) .................................. 2022-016112

(51) Int. Cl.
*B60W 30/12* (2020.01)
*B60W 10/04* (2006.01)
*B60W 10/18* (2012.01)
*B60W 50/14* (2020.01)

(52) U.S. Cl.
CPC ............ *B60W 30/12* (2013.01); *B60W 10/04* (2013.01); *B60W 10/18* (2013.01); *B60W 50/14* (2013.01); *B60W 2540/10* (2013.01); *B60W 2552/05* (2020.02); *B60W 2552/53* (2020.02)

(58) Field of Classification Search
None
See application file for complete search history.

(56) References Cited

U.S. PATENT DOCUMENTS

| 10,272,838 B1* | 4/2019 | Pertsel .................... B60Q 5/005 |
| 11,001,255 B2 | 5/2021 | Fukuman et al. |
| 11,891,084 B2* | 2/2024 | Kim ....................... G06V 20/588 |
| 2008/0021608 A1 | 1/2008 | Schmitz |
| 2018/0237007 A1* | 8/2018 | Adam .................... B60W 50/14 |

(Continued)

FOREIGN PATENT DOCUMENTS

| JP | H11-034898 A | 2/1999 |
| JP | 2002-092794 A | 3/2002 |
| JP | 2008-515070 A | 5/2008 |

(Continued)

*Primary Examiner* — James J Lee
*Assistant Examiner* — David Hatch
(74) *Attorney, Agent, or Firm* — Dinsmore & Shohl LLP

(57) ABSTRACT

A driving support device including: an in-vehicle sensor configured to acquire and output each of position information relating to a position of an own vehicle, target information relating to a target positioned around the own vehicle, and operation information relating to an operation of an operating element of the own vehicle; and a control device having a lane departure prevention function for preventing the own vehicle from departing from a lane in which the own vehicle is traveling by activating at least one device among a notification device, a drive device, and a braking device mounted on the own vehicle in a situation in which an accelerator pedal of the own vehicle is erroneously operated and an angle between a traveling direction of the own vehicle and a boundary line of the lane detected based on the target information is equal to or less than a predetermined threshold value.

7 Claims, 11 Drawing Sheets

(56) References Cited

U.S. PATENT DOCUMENTS

2019/0100133 A1* 4/2019 Bensalem .............. B60Q 1/346
2023/0035434 A1 2/2023 Ishii et al.

FOREIGN PATENT DOCUMENTS

| JP | 2012-069053 A | 4/2012 |
| JP | 2012-116436 A | 6/2012 |
| JP | 2016-004521 A | 1/2016 |

* cited by examiner

DRIVING SUPPORT DEVICE

CROSS-REFERENCE TO RELATED APPLICATIONS

This application claims priority to Japanese Patent Application No. 2022-016112 filed on Feb. 4, 2022, which is incorporated herein by reference in its entirety including the description, claims, drawings, and abstract.

BACKGROUND

1. Technical Field

The present disclosure relates to a driving support device for preventing an own vehicle from departing (a departure not intended by a driver) from a lane (traveling lane) in which the driver is driving the own vehicle.

2. Description of the Related Art

Hitherto, there has been known a driving support device (hereinafter referred to as "related-art device") capable of executing lane departure prevention control for preventing a vehicle traveling along a lane from departing from the lane (see, for example, Japanese Patent Application Laid-open No. Hei 11-034898). The related-art device executes lane departure prevention control when the vehicle is about to depart from the lane. For example, there has been proposed a device that executes notification control for producing a predetermined warning sound in a situation in which an angle between a traveling direction of an own vehicle and an extending direction of a boundary line of the lane is smaller than a predetermined threshold value.

Incidentally, there are cases in which the driver deeply depresses an accelerator pedal by accident so that a vehicle may depart from the lane. In this case, the lane departure prevention control may be executed. Meanwhile, there are cases in which the driver intentionally departs from the lane. For example, when the vehicle is to turn right (or left) at an intersection, the accelerator pedal may be depressed to accelerate the own vehicle. At that time, the own vehicle may cross a boundary line of the lane. In this case, the lane departure prevention control may not be executed. With the related-art device, there are cases in which lane departure prevention control is executed even though the driver intends to intentionally depart from the lane.

SUMMARY

One object of the present disclosure is to provide a driving support device having improved practicality.

In order to solve the above-mentioned problem, according to at least one embodiment of the present disclosure, there is provided a driving support device (1, 2, 3, 4) including: an in-vehicle sensor (20) configured to acquire and output each of position information relating to a position of an own vehicle, target information relating to a target positioned around the own vehicle, and operation information relating to an operation of an operating element of the own vehicle; and a control device (10) having a lane departure prevention function for preventing the own vehicle from departing from a lane in which the own vehicle is traveling by activating at least one device among a notification device, a drive device, and a braking device mounted on the own vehicle in a situation in which an accelerator pedal of the own vehicle is erroneously operated and an angle ($\theta$) between a traveling direction of the own vehicle and a boundary line of the lane detected based on the target information is equal to or less than a predetermined threshold value. The control device is configured to disable the lane departure prevention function in a special situation representing a situation in which the own vehicle enters, from a first lane (La) in which the own vehicle has traveled, a second lane (Lb) intersecting the first lane.

In general, in the situation in which the own vehicle enters the second lane from the first lane, there is a high possibility that a driver drives the own vehicle so that the vehicle crosses the boundary line of the lane. However, with the driving support device according to the at least one embodiment of the present disclosure, in this situation, unrequired lane departure prevention control is disabled. Therefore, the driving support device according to the at least one embodiment of the present disclosure is more practical than the related-art device.

In the driving support device (1) according to one aspect of the present disclosure, the special situation is a situation in which one of a time (T) or a distance for which the own vehicle has traveled in a current lane since start of traveling in the current lane by the own vehicle is less than a predetermined threshold value.

With this configuration, the control device can relatively easily recognize that the own vehicle has started entering the second lane from the first lane based on the time or distance for which the own vehicle has traveled in the current lane since the own vehicle started traveling in the current lane.

In the driving support device (2) according to another aspect of the present disclosure, the control device is configured to calculate one of a distance or a time for which the own vehicle has traveled along the lane in one of a situation in which the boundary line of the lane is continuous or a situation in which the boundary line is regarded as being continuous, and to initialize one of the distance or the time for which the own vehicle has traveled along the lane in a situation in which the boundary line is interrupted.

With this configuration, for example, when the boundary line is formed of, for example, intermittently arranged poles or curbstones, the time or distance for which the own vehicle has traveled in the lane can be calculated by regarding the boundary line as being continuous. Further, for example, in a situation in which the boundary line is interrupted at, for example, an intersection, the time or distance for which the own vehicle has traveled in the lane can be initialized.

In the driving support device according to still another aspect of the present disclosure, the special situation is a situation in which a mode of a driving operation of a driver matches a predetermined mode.

With this configuration, the control device can relatively easily recognize that the own vehicle has started entering the second lane from the first lane based on the mode of the driving operation by the driver.

In the driving support device according to still another aspect of the present disclosure, the special situation is a situation in which the mode of the driving operation of the driver matches a mode (OPD) defined in advance as a mode of the driving operation when the own vehicle is turning right or left at an intersection.

With this configuration, the control device can relatively easily recognize that the own vehicle is turning right or left at an intersection.

In the driving support device (3) according to still another aspect of the present disclosure, the special situation is a situation in which the own vehicle is positioned in a predetermined region (R).

With this configuration, the control device can relatively easily recognize, based on the position of the own vehicle, that there is a high possibility that the own vehicle is to start entering the second lane from the first lane.

In the driving support device according to still another aspect of the present disclosure, the special situation is a situation in which the own vehicle is positioned in a region in which a distance from a center of a predetermined intersection is equal to or less than a predetermined value.

With this configuration, an intersection and a region surrounding the intersection can be relatively easily defined as a region in which there is a high possibility that the own vehicle is to cross the boundary line of the lane.

In the driving support device (4) according to still another aspect of the present disclosure, the special situation is a situation in which the control device recognizes that the own vehicle is turning right or left based on the target information.

For example, the control device stores in advance a plurality of pieces of time-series data each representing a change in target information during a right turn and a left turn, and can recognize whether the own vehicle is turning right or left by comparing the stored time-series data with time-series data of the target information acquired during travel.

DESCRIPTION OF THE EMBODIMENTS

First Embodiment (Outline of Configuration)

Figure 1:
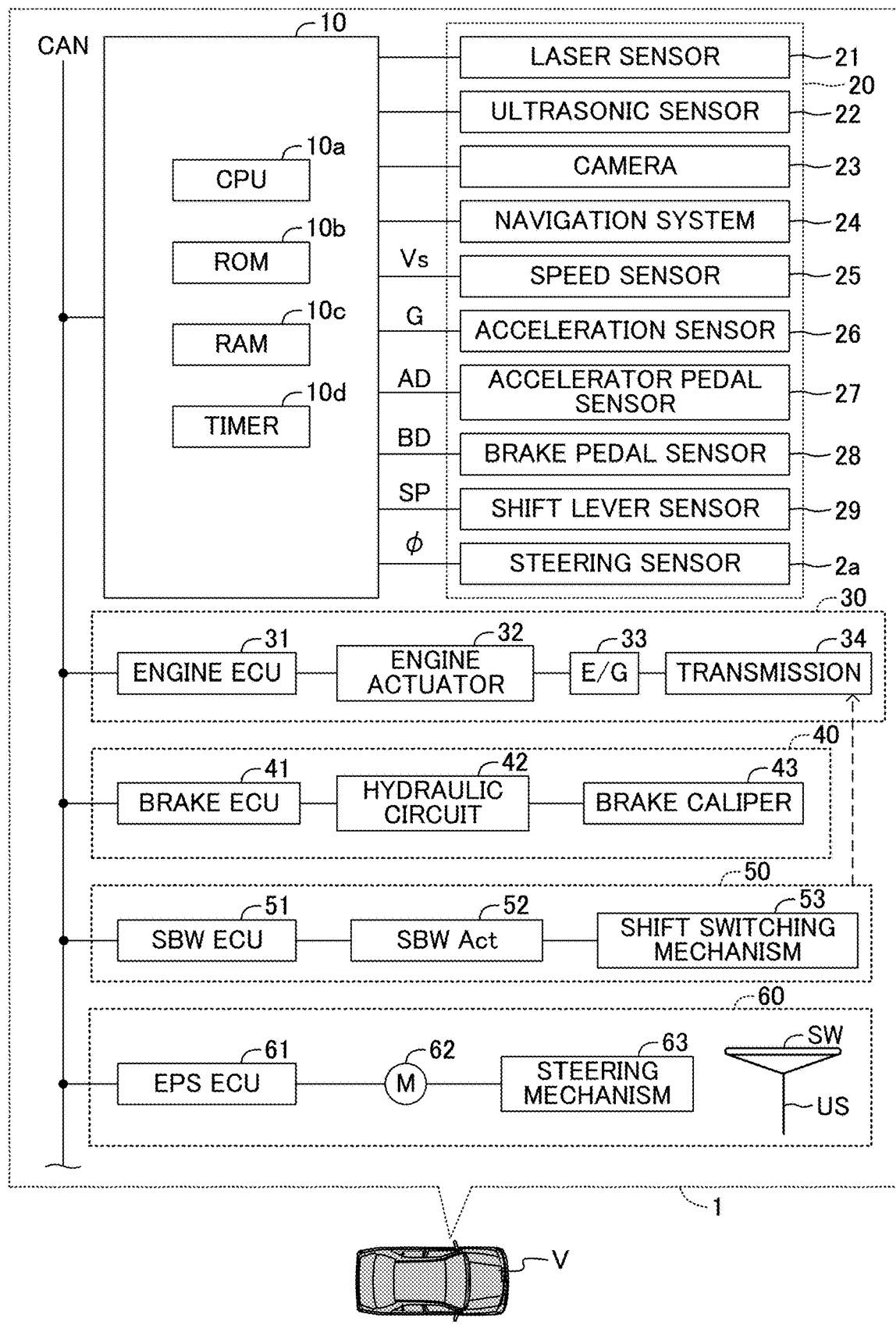
FIG. 1 is a block diagram of a driving support device according to at least one embodiment of the present disclosure.

As illustrated in FIG. 1, a driving support device 1 according to at least one embodiment of the present disclosure is mounted on a vehicle V (which may be hereinafter referred to as "own vehicle"). As described in detail later, the driving support device 1 has a lane departure prevention function for preventing, based on information acquired from sensors mounted on the vehicle V, the vehicle V from departing from a lane (travel road) in which the vehicle V is traveling.

(Specific Configuration)

As illustrated in FIG. 1, the driving support device 1 includes a driving support ECU 10, in-vehicle sensors 20, a drive device 30, a braking device 40, a shift switching device 50, and a steering device 60.

The driving support ECU 10 includes a microcomputer including, for example, a CPU 10a, a ROM 10b, a RAM 10c, and a timer 10d. As used herein, "ECU" means an electronic control unit, and the ECU includes a microcomputer including, for example, a CPU, a RAM, and a ROM. The CPU implements various functions by executing instructions stored in the ROM.

The driving support ECU 10 is connected to other ECUs (engine ECU 31, brake ECU 41, SBW ECU 51, and EPS ECU 61 described later) via a controller area network (CAN) in a manner that enables information to be transmitted and received to and from each other.

The in-vehicle sensors 20 include sensors which acquire vehicle peripheral information (target information) including information on three-dimensional objects present around the vehicle V and information on boundary lines (separation lines) of a road surface around the vehicle V. That is, the in-vehicle sensors 20 include sensors which acquire information relating to, for example, moving objects, such as an automobile (another vehicle), a pedestrian, or a bicycle, and fixed objects, such as a white line on the road surface, a guardrail, or a traffic light.

Specifically, the in-vehicle sensors 20 include a radar sensor 21, an ultrasonic sensor 22, a camera 23, and a navigation system 24.

The radar sensor 21 includes a radar transmitting/receiving unit and a signal processing unit (which are not shown). The radar transmitting/receiving unit radiates radio waves in the millimeter wave band (hereinafter referred to as "millimeter waves") into an area around the vehicle, and receives the millimeter waves reflected by a three-dimensional object present within a radiation range (that is, reflected waves). The signal processing unit acquires information representing, for example, a distance between the vehicle V and the three-dimensional object, a relative speed between the vehicle V and the three-dimensional object, and a relative position (direction) of the three-dimensional object with respect to the vehicle V based on, for example, a phase difference between the transmitted millimeter waves and the received reflected waves, an attenuation level of the reflected waves, and a period of time from the transmission of the millimeter waves to the reception of the reflected waves, and transmits the acquired information to the driving support ECU 10.

The ultrasonic sensor 22 transmits ultrasonic waves in pulses into a predetermined range around the vehicle, and receives the reflected waves reflected by the three-dimensional object. The ultrasonic sensor 22 acquires information representing, for example, a "reflection point, which is a point on the three-dimensional object from which the transmitted ultrasonic waves are reflected," and a "distance between the ultrasonic sensor and the three-dimensional object" based on the period of time from the transmission of the ultrasonic waves to the reception of the reflected waves, and transmits the acquired information to the driving support ECU 10.

The camera 23 includes an image pickup device and an image analysis device. The image pickup device is, for example, a digital camera having a built-in image pickup element being a charge-coupled device (CCD) or a CMOS image sensor (CIS). The image pickup device is arranged on an upper part of a front windshield glass. The image pickup device outputs image data obtained by photographing the foreground of the vehicle at a predetermined frame rate to the image analysis device. The image analysis device analyzes the obtained image data, acquires information relating to a target positioned in front of the vehicle V from the image, and transmits the acquired information to the driving support ECU 10. For example, the image analysis device recognizes a signal color of a traffic light positioned in front of the vehicle V in a traveling direction. The image analysis device also recognizes, for example, boundary lines (separation lines, or stop lines) of a road, and transmits information representing the recognition result to the driving support ECU 10.

The navigation system 24 receives GPS signals from a plurality of satellites, and detects a current position PV (latitude and longitude) of the vehicle V based on the plurality of received GPS signals. Further, the navigation system 24 stores map data representing a map. The navigation system 24 transmits vehicle position information representing the detected current position to the driving support ECU 10.

The in-vehicle sensors 20 also include a sensor which acquires information relating to a travel state of the vehicle V (such as speed, acceleration, and operation mode of an operating element).

Specifically, the in-vehicle sensors 20 include a speed sensor 25, an acceleration sensor 26, an accelerator pedal sensor 27, a brake pedal sensor 28, a shift lever sensor 29, and a steering sensor 2a.

The speed sensor 25 includes a wheel speed sensor which generates one pulse signal (wheel pulse signal) each time a wheel of the own vehicle rotates by a predetermined angle. The speed sensor 25 measures the number of pulses of the wheel pulse signal transmitted from the wheel speed sensor in unit time, calculates a rotation speed (wheel speed) of each wheel based on the measured number of pulses, and calculates a vehicle speed Vs (actual vehicle speed) of the own vehicle based on the wheel speed of each wheel. The speed sensor 25 transmits data representing the vehicle speed Vs to the driving support ECU 10.

The acceleration sensor 26 detects an acceleration Ga acting on the vehicle V (for example, an acceleration acting in a width direction of the vehicle V when the vehicle V is traveling on a curved road, and an acceleration acting in a longitudinal direction of the vehicle V when the vehicle V is traveling on a straight road). The acceleration sensor 26 transmits data representing the acceleration Ga to the driving support ECU 10.

The accelerator pedal sensor 27 detects a depression depth AD of an accelerator pedal (not shown) of the vehicle V. The accelerator pedal sensor 27 transmits data representing the depression depth AD of the accelerator pedal to the driving support ECU 10.

The brake pedal sensor 28 detects a depression depth BD of a brake pedal (not shown) of the vehicle V. The brake pedal sensor 28 transmits data representing the depression depth BD of the brake pedal to the driving support ECU 10.

The shift lever sensor 29 detects a position (shift lever position SP) of a shift lever (not shown) of the vehicle V. The shift lever sensor 29 transmits data representing the shift lever position SP to the driving support ECU 10.

The steering sensor 2a detects a steering angle (also referred to as "turning angle" or "steered angle") Φ of a steering wheel. The steering sensor 2a transmits data representing the detected steering angle Φ to the driving support ECU 10.

The in-vehicle sensors 20 also include various switches (for example, a switch for detecting an operation state of a direction indicator operating lever) included in the vehicle V.

The drive device 30 generates a driving force, and applies the driving force to drive wheels out of wheels (left front wheel, right front wheel, left rear wheel, and right rear wheel). The drive device 30 includes, for example, the engine ECU 31, an engine actuator 32, an internal combustion engine 33, a transmission 34, and a driving force transmission mechanism (not shown) which transmits a driving force to the wheels. The engine ECU 31 is connected to the engine actuator 32. The engine actuator 32 includes a throttle valve actuator which changes an opening degree of a throttle valve of the internal combustion engine 33. The engine ECU 31 acquires the depression depth AD of the accelerator pedal from the driving support ECU 10. The driving support ECU 10 can appropriately correct the depression depth AD acquired from the accelerator pedal sensor 27, and transmit the corrected depression depth AD to the engine ECU 31. The engine ECU 31 drives the engine actuator 32 in accordance with the depression depth AD acquired from the driving support ECU 10. In this way, the torque generated by the internal combustion engine 33 is controlled. The torque generated by the internal combustion engine 33 is transmitted to the drive wheels via the transmission 34 and the driving force transmission mechanism (for example, a drive shaft).

When the vehicle V to which the driving support device 1 is applied is a hybrid electric vehicle (HEV), the engine ECU 31 can control the driving force of the vehicle generated by any one or both of "an internal combustion engine and an electric motor" serving as a vehicle drive source. Further, when the vehicle V to which the driving support device 1 is applied is a battery electric vehicle (BEV), an electric motor ECU which controls the driving force of the vehicle generated by an "electric motor" serving as the vehicle drive source may be used instead of the engine ECU 31.

The braking device 40 applies a braking force to the wheels. The braking device 40 includes the brake ECU 41, a hydraulic circuit 42, and a brake caliper 43. The hydraulic circuit 42 includes, for example, a reservoir, an oil pump, various valve devices, and a hydraulic sensor (which are not shown). The brake caliper 43 is a hydraulic actuator including a cylinder and a piston. When oil is supplied to the cylinder, the piston is pushed out of the cylinder. A brake pad is arranged at the tip of the piston, and the brake pad is pressed against a brake disc. The brake ECU 41 acquires the depression depth BD of the brake pedal from the driving support ECU 10. The driving support ECU 10 can appropriately correct the depression depth BD acquired from the brake pedal sensor 28, and transmit the corrected depression depth BD to the brake ECU 41. The brake ECU 41 transmits a hydraulic pressure control command to the hydraulic circuit 42 in accordance with the depression depth BD acquired from the driving support ECU 10. The hydraulic circuit 42 adjusts the hydraulic pressure in the cylinder of the brake caliper 43 in accordance with the hydraulic pressure control command acquired from the brake ECU 41. In this way, the braking force of the wheels (brake discs) by the brake caliper 43 is controlled.

The shift switching device 50 switches a shift position of the transmission 34. The shift switching device 50 includes, for example, the shift-by-wire (SBW) ECU 51, an SBW actuator 52, and a shift switching mechanism 53. The SBW ECU 51 is connected to the SBW actuator 52. The SBW ECU 51 acquires the shift lever position SP from the driving support ECU 10. The driving support ECU 10 can appropriately correct the shift lever position SP acquired from the shift lever sensor 29, and transmit the corrected shift lever position SP to the SBW ECU 51. The SBW ECU 51 transmits a shift switching command to the SBW actuator 52 in accordance with the shift lever position SP acquired from the driving support ECU 10. The SBW actuator 52 controls the shift switching mechanism 53 in accordance with the shift switching command acquired from the SBW ECU 51. In this way, the shift position of the transmission 34 is switched.

The steering device 60 controls the turning angle of each of steered wheels (left front wheel and right front wheel). The steering device 60 includes the electric power steering ECU (hereinafter referred to as "EPS ECU") 61, an assist motor (M) 62, and a steering mechanism 63. The EPS ECU 61 is connected to the assist motor 62 (to a drive circuit of the assist motor 62). The assist motor 62 is incorporated in the steering mechanism 63. The steering mechanism 63 is a mechanism for steering the steered wheels. The steering mechanism 63 includes, for example, a steering wheel SW, a steering shaft US, and a steering gear mechanism (not shown). The EPS ECU 61 uses a steering torque sensor (not shown) arranged on the steering shaft US to detect a steering torque input to the steering wheel SW by a driver, and drives the assist motor 62 based on the detected steering torque. The EPS ECU 61 can assist a steering operation by the driver by applying a steering torque (steering assist torque) to the steering mechanism 63 by driving the assist motor 62.

In addition, the EPS ECU 61 acquires the steering angle Φ from the driving support ECU 10. The driving support ECU 10 can appropriately correct the steering angle Φ acquired from the steering sensor 2a, and transmit the corrected steering angle Φ to the EPS ECU 61. The EPS ECU 61 can transmit a steering command to the EPS ECU 61 in accordance with the steering angle Φ acquired from the driving support ECU 10. When the EPS ECU 61 receives a steering command from the driving support ECU 10, the EPS ECU 61 drives the assist motor 62 based on the steering command. In this case, the steering torque generated by the assist motor 62 differs from the above-mentioned steering assist torque applied in order to assist the steering by the driver, and is a torque applied to the steering mechanism 63 by a steering command from the EPS ECU 61 without requiring steering by the driver. In this way, the turning angle of each of the steered wheels of the vehicle is controlled.

(Lane Departure Prevention Function)

Figure 2:
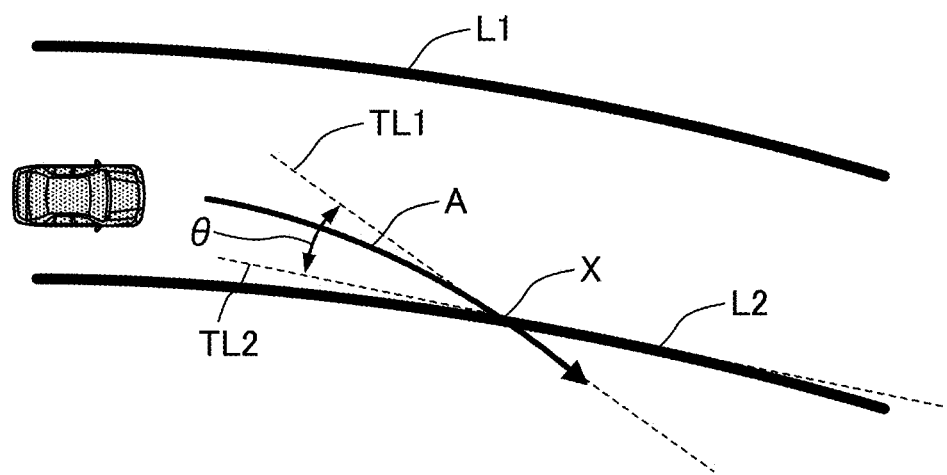
FIG. 2 is a plan view for illustrating an angle θ.

Next, the lane departure prevention function of the driving support device 1 is described. As illustrated in FIG. 2, the driving support ECU 10 calculates (predicts) each point through which the own vehicle is to pass in a predetermined period of time from the current time (a locus of the center of gravity of the own vehicle (hereinafter referred to as "predicted travel line A")) based on the data (for example, the speed and turning angle of the own vehicle) acquired from the in-vehicle sensors 20. Next, the driving support ECU 10 recognizes, based on the data acquired from the in-vehicle sensors 20, for example, the boundary lines of the lane around the own vehicle (for example, a white line, curbstone, or median strip on the right side of the own vehicle in the traveling direction (hereinafter referred to as "white line L1") and a white line, curbstone, or median strip on the left side of the own vehicle in the traveling direction (hereinafter referred to as "white line L2")). Next, the driving support ECU 10 calculates an intersection point X between the predicted travel line A and the white line L1 or L2. Next, the driving support ECU 10 calculates a tangent line TL1 to the predicted travel line A at the intersection point X and a tangent line TL2 to the white line L1 or L2 at the intersection point X. Then, the driving support ECU 10 calculates an angle θ between the tangent line TL1 and the tangent line TL2.

In this case, when the own vehicle is traveling parallel to a center line Lc connecting each of central points in the width direction of the lane (that is, when the predicted travel line A and the center line Lc match), the angle θ is "0". Meanwhile, when the own vehicle is traveling in a direction at an angle with respect to the center line Lc, the angle θ is larger than "0". As the angle θ becomes larger, the possibility that the own vehicle departs from the lane becomes higher.

Further, the driving support ECU 10 detects an erroneous operation of the accelerator pedal based on the data (depression depth AD of the accelerator pedal) acquired from the in-vehicle sensors 20. That is, the driving support ECU 10 determines whether or not the driver has erroneously depressed and operated the accelerator pedal. For example, when the depression depth of the accelerator pedal exceeds a predetermined threshold value, the driving support ECU 10 determines that "the accelerator pedal has been erroneously operated." The driving support ECU 10 may determine that "the accelerator pedal has been erroneously operated" when an amount of change per unit time in the depression depth of the accelerator pedal exceeds a threshold value. Further, the driving support ECU 10 may determine whether or not the accelerator pedal has been erroneously operated based on the acceleration or the change in acceleration acquired from the acceleration sensor 26.

When the driving support ECU 10 determines that "the accelerator pedal has been erroneously operated", the driving support ECU 10 calculates a time until the own vehicle departs from the lane (time until the own vehicle crosses the white line L1 or white line L2) based on the speed, acceleration, and steering angle of the own vehicle (hereinafter referred to as "predicted time T1").

In principle, the driving support ECU 10 executes lane departure prevention control in a situation in which the accelerator pedal is being erroneously operated, the angle θ is less than a predetermined threshold value θth, and the predicted time T1 is equal to or less than a predetermined threshold value T1th. For example, the driving support ECU 10 executes predetermined notification control as the lane departure prevention control. That is, the driving support ECU 10 causes an image display device of the navigation system 24 to display a predetermined image, and causes an audio device of the navigation system 24 to reproduce a predetermined sound. Further, as the lane departure prevention control, the driving support ECU 10 may control the drive device 30 and/or the braking device 40 to execute braking control for decelerating the own vehicle.

For example, when the own vehicle is turning right or left at an intersection, the driver may accelerate the own vehicle to some extent. At that time, when the above-mentioned lane departure prevention control is executed, the driver may feel annoyed. In view of this, the driving support device 1 does not execute notification control and/or braking control in the following situations (special situations which can be regarded as turning right or left). That is, the driving support ECU 10 has a cancel function which disables the lane departure prevention function in special situations.

(Cancel Function)

The driving support ECU 10 measures, based on the information acquired from the in-vehicle sensors 20, a time T for which the own vehicle has traveled along each lane since the own vehicle started traveling in the lane. Specifically, from a point in time when the white line L1 or the white line L2 can be recognized, the driving support ECU 10 starts measuring the time T for which the own vehicle has advanced under a state in which the angle θ is equal to or less than the threshold value θth. The driving support ECU 10 initializes the time T to "0" (sets the time T to "0") when the angle θ is equal to or more than the threshold value θth, or when the white lines L1 and L2 cannot be recognized. In a case in which the white line L1 (and/or the white line L2) is interrupted, when a portion positioned in front of the interruption point and a portion positioned behind the interruption point are substantially parallel, and a distance between the portions in front of and behind the interruption point is equal to or less than a predetermined value Δd, the driving support ECU 10 performs a complementary calculation for the interruption point. That is, the driving support ECU 10 regards the white line L1 (and/or the white line L2) as a continuous line. Meanwhile, when the portions in front of and behind the interruption point are not parallel, the driving support ECU 10 initializes the time T. The predetermined value Δd is smaller than a width of a general road. At a point in time when an own vehicle traveling in a lane La enters an intersection J, the driving support ECU 10 can no longer recognize the white line L1 and/or the white line L2, and the time T is initialized. Then, when the own vehicle starts to turn right and advances a little so that the white line L1 and/or the white line L2 of a lane Lb can be recognized, and the angle θ is less than the threshold value θth (see FIG. 3), the driving support ECU 10 starts measuring the time T.

The driving support ECU 10 prohibits the execution of notification control and/or braking control in a situation in which the time T is less than a predetermined threshold value Tth (stage at which the vehicle starts to travel along the lane).

Figure 4:
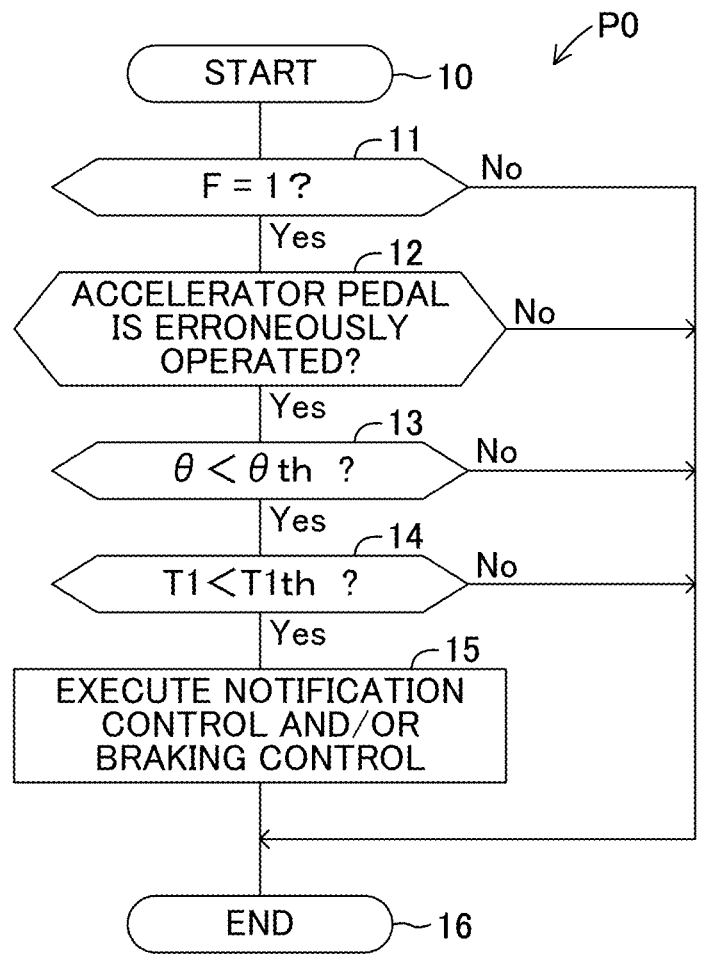
FIG. 4 is a flowchart of a program P0.
Figure 5:
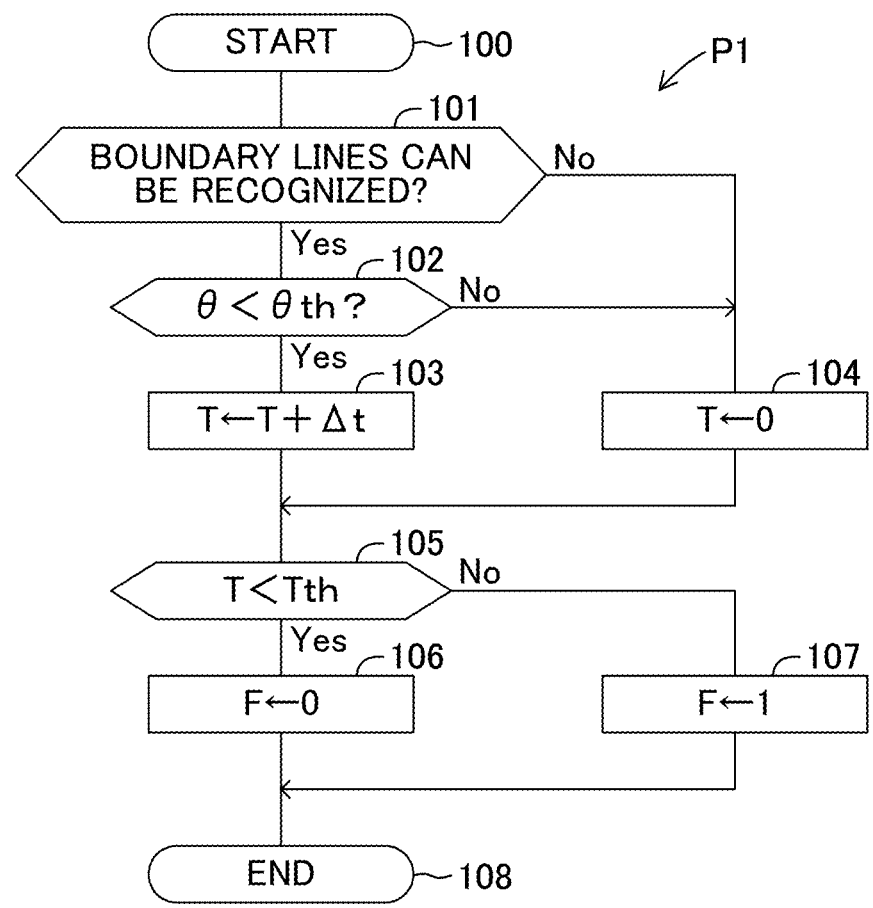
FIG. 5 is a flowchart of a program P1.

Next, with reference to FIG. 4 and FIG. 5, operation (a program P0 (FIG. 4) and a program P1 (FIG. 5) for implementing the lane departure prevention function and the cancel function) of the CPU of the driving support ECU 10 (hereinafter simply referred to as "CPU") is specifically described. The CPU executes the program P0 and the program P1 at predetermined time intervals. A control flag F is used in both programs. The control flag F represents whether or not notification control and/or braking control is/are to be executed. That is, when the control flag F is "1", the CPU executes notification control and/or braking control, and when the control flag F is "0", the CPU does not execute notification control and/or braking control. As described later, the CPU executes the program P1 to switch the value of the control flag F.

(Program P0)

The CPU starts executing the program P0 from Step 10, and then advances the process to Step 11.

In Step 11, the CPU determines whether or not the control flag F is "1". When the control flag F is "1" ("Yes" in Step 11), the CPU advances the process to Step 12. Meanwhile, when the control flag F is "0" ("No" in Step 11), the CPU advances the process to Step 16, and ends execution of the program P0. That is, in this case, the CPU does not execute notification control and/or braking control.

In Step 12, the CPU determines whether or not an erroneous operation of the accelerator pedal has occurred (the accelerator pedal is depressed by mistake). When an erroneous operation of the accelerator pedal has occurred ("Yes" in Step 12), the CPU advances the process to Step 13. Meanwhile, when an erroneous operation of the accelerator pedal has not occurred ("No" in Step 12), the CPU advances the process to Step 16.

In Step 13, the CPU determines whether or not the angle θ is less than the threshold value θth. When the angle θ is less than the threshold value θth ("Yes" in Step 13), the CPU advances the process to Step 14. Meanwhile, when the angle θ is equal to or more than the threshold value θth ("No" in Step 13), the CPU advances the process to Step 16.

In Step 14, the CPU determines whether or not the predicted time T1 from the current time until the own vehicle departs from the lane is less than the threshold value T1th. When the predicted time T1 is less than the threshold value T1th ("Yes" in Step 14), the CPU advances the process to Step 15. Meanwhile, when the predicted time T1 is equal to or more than the threshold value T1th ("No" in Step 14), the CPU advances the process to Step 16.

In Step 15, the CPU executes notification control and/or braking control, advances the process to Step 16, and then ends execution of the program P0.

(Program P1)

The CPU starts executing the program P1 from Step 100, and then advances the process to Step 101.

In Step 101, the CPU determines whether or not the boundary lines (white lines L1 and L2) of the lane can be recognized. When the boundary lines of the lane can be recognized ("Yes" in Step 101), the CPU advances the process to Step 102. Meanwhile, when the boundary lines of the lane cannot be recognized ("No" in Step 101), the CPU advances the process to Step 104. For example, at a stage immediately after the own vehicle enters the intersection J, the CPU cannot recognize the boundary lines. Therefore, at this stage, the CPU advances the process to Step 104.

In Step 102, the CPU determines whether or not the angle θ is less than the threshold value θth. When the angle θ is less than the threshold value θth ("Yes" in Step 102), the CPU advances the process to Step 103. Meanwhile, when the angle θ is equal to or more than the threshold value θth ("No" in Step 102), the CPU advances the process to Step 104.

In Step 103, the CPU adds an infinitesimal time Δt to the time T, and then advances the process to Step 105.

In Step 104, the CPU initializes the time T (sets the time T to "0"), and then advances the process to Step 105.

In Step 105, the CPU determines whether or not the time T is less than the threshold value Tth. When the time T is less than the threshold value Tth ("Yes" in Step 105), the CPU advances the process to Step 106. Meanwhile, when the time T is equal to or more than the threshold value Tth ("No" in Step 105), the CPU advances the process to Step 107.

In Step 106, the CPU sets the control flag F to "0", advances the process to Step 108, and then ends execution of the program P1.

In Step 107, the CPU sets the control flag F to "1", and then advances the process to Step 108.

(Effects)

Figure 3:
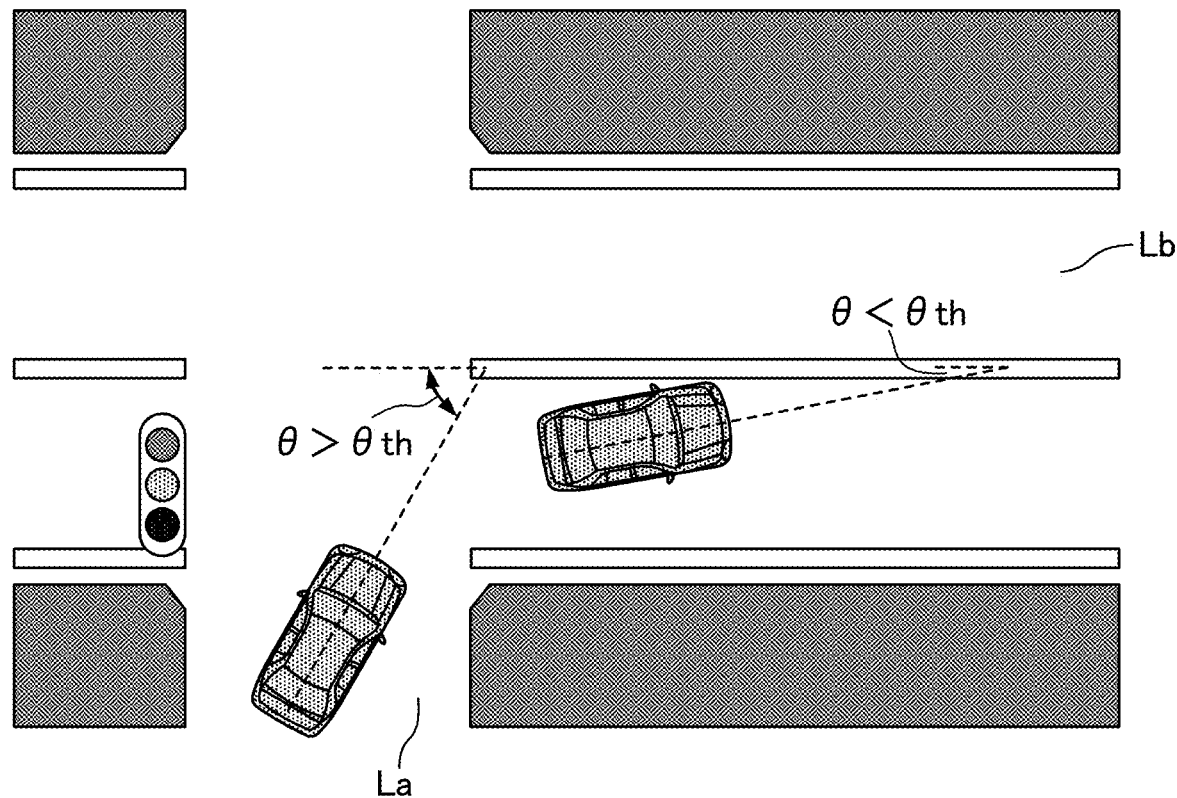
FIG. 3 is a plan view for illustrating a change in the angle θ in a situation in which an own vehicle is turning right at an intersection.

As illustrated in FIG. 3, when the own vehicle enters the intersection J from the lane La, the CPU can no longer recognize the boundary lines of the lane La. Therefore, the CPU initializes the time T. When the own vehicle starts to turn right, a boundary line of the lane Lb becomes recognizable. At an initial stage at which the own vehicle starts to turn right, the angle θ is greater than the threshold value θth. Therefore, at this stage, the CPU does not execute notification control and/or braking control. When the own vehicle advances further and the angle θ becomes less than the threshold value θth, the CPU starts measuring the time T (executes processing to add the infinitesimal time Δt). A situation in which the time T measured in this way is less than the threshold value Tth can be regarded as a situation in which the own vehicle is turning right or left. Therefore, in such a situation, the CPU does not execute notification control and/or braking control (the control flag F is set to "0"). Thus, the driving support device 1 according to a first embodiment of the present disclosure can prevent the execution of unrequired notification control and/or braking control in the situation in which the own vehicle is turning right or left. That is, the driving support device 1 according to the first embodiment is more practical than the related-art device.

Second Embodiment

Next, a driving support device 2 according to a second embodiment of the present disclosure is described. The driving support device 2 has the following cancel function in place of the cancel function in the first embodiment. Other configurations of the driving support device 2 are the same as those of the driving support device 1.
(Cancel Function)

The driving support ECU 10 (ROM 10b) stores driving operation pattern data OPD representing typical operation modes of driving operating elements (for example, steering wheel, accelerator pedal, brake pedal, shift lever, and direction indicator operation lever) by the driver when the own vehicle is turning right (or left) at an intersection. The driving support ECU 10 monitors (records) a driving operation pattern OP of the driving operating elements by the driver during the travel of the own vehicle, and determines that "the own vehicle is turning right (or left)" when the driving operation pattern OP of the driving operating elements matches any of the driving operation pattern data OPD.

Specifically, when a vehicle is to turn right (or left) at an intersection, the driver often operates the driving operating elements as follows.

Depresses the brake pedal to decelerate (or stop) the own vehicle.

Operates the direction indicator operation lever to notify that the own vehicle is to turn right (or left).

Operates the steering wheel to adjust the turning angle while adjusting the depression depth of the accelerator pedal and the depression depth of the brake pedal to accelerate the own vehicle.

Data representing the above-mentioned operation modes is stored in the ROM 10b as the driving operation pattern data OPD when the own vehicle is turning right (or left) at an intersection. The ROM 10b stores a plurality of types of the driving operation pattern data OPD corresponding to configurations of intersections (for example, road width, and presence/absence of right-turn lane and left-turn lane).

Figure 6:
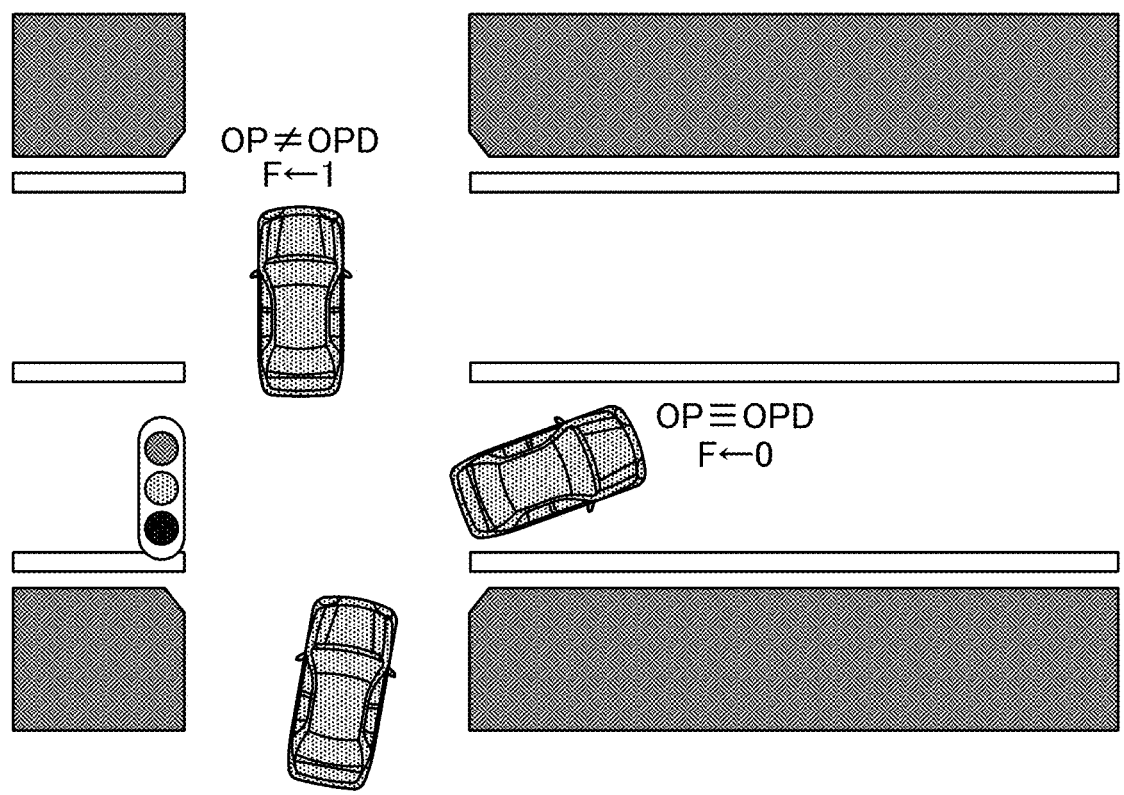
FIG. 6 is a plan view for illustrating setting of a control flag F in accordance with a driving operation pattern.

The driving support ECU 10 sequentially detects the mode of the driving operation of the driver. Specifically, the driving support ECU 10 acquires and stores (samples) an operation amount of each driving operating element at predetermined time intervals. The driving support ECU 10 compares the most recent portion (driving operation pattern OP) of the time-series data obtained in this way with the driving operation pattern data OPD. That is, the driving support ECU 10 executes pattern matching between the detected driving operation pattern OP and the driving operation pattern data OPD. When a degree of similarity between the two exceeds a predetermined threshold value, the driving support ECU 10 prohibits the execution of notification control and/or braking control (see FIG. 6).

Figure 7:
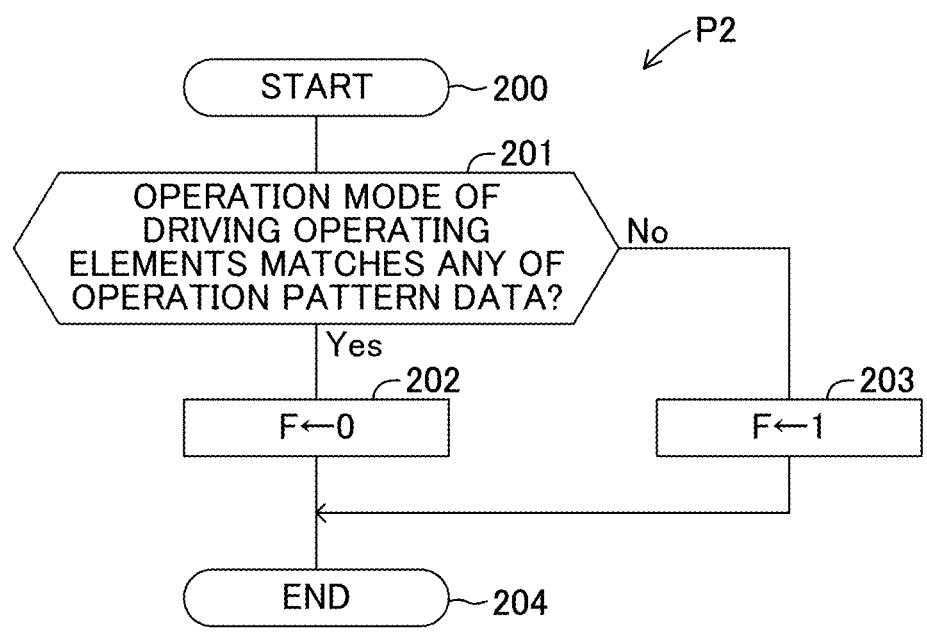
FIG. 7 is a flowchart of a program P2.

Next, with reference to FIG. 7, operation (a program P2 for implementing the above-mentioned cancel function) of the CPU is specifically described. The CPU executes the program P2 in place of the program P1 in the first embodiment.
(Program P2)

The CPU starts executing the program P2 from Step 200, and then advances the process to Step 201.

In Step 201, the CPU detects the driving operation pattern OP of the driving operating elements by the driver. Then, the CPU determines whether or not the driving operation pattern OP matches any of the driving operation pattern data OPD stored in the ROM 10b. For example, in a situation in which "the direction indicator is activated while the own vehicle is decelerating or is stopped, and then the own vehicle is being steered while accelerating", the CPU determines that the detected driving operation pattern OP matches the driving operation pattern data OPD of a situation in which a vehicle is turning right (or left) at an intersection.

When the detected driving operation pattern OP matches any of the driving operation pattern data OPD ("Yes" in Step 201), the CPU advances the process to Step 202. Meanwhile, when the detected driving operation pattern OP does not match any of the driving operation pattern data OPD ("No" in Step 201), the CPU advances the process to Step 203.

In Step 202, the CPU sets the control flag F to "0", and in Step 204, the CPU ends execution of the program P2.

In Step 203, the CPU sets the control flag F to "1", and then advances the process to Step 204.
(Effects)

In the second embodiment, the CPU recognizes whether or not the own vehicle is turning right or left based on the detected driving operation pattern. In a situation in which the own vehicle is turning right or left (special situation), the CPU does not execute notification control and/or braking control (the control flag F is set to "0"). Thus, the driving support device 2 according to the second embodiment can prevent the execution of unrequired notification control and/or braking control in the situation in which the own vehicle is turning right or left. That is, the driving support device 2 according to the second embodiment is more practical than the related-art device.

Third Embodiment

Next, a driving support device 3 according to a third embodiment of the present disclosure is described. The driving support device 3 has the following cancel function in place of the cancel function in the first embodiment. Other configurations of the driving support device 3 are the same as those of the driving support device 1.
(Cancel Function)

Figure 8:
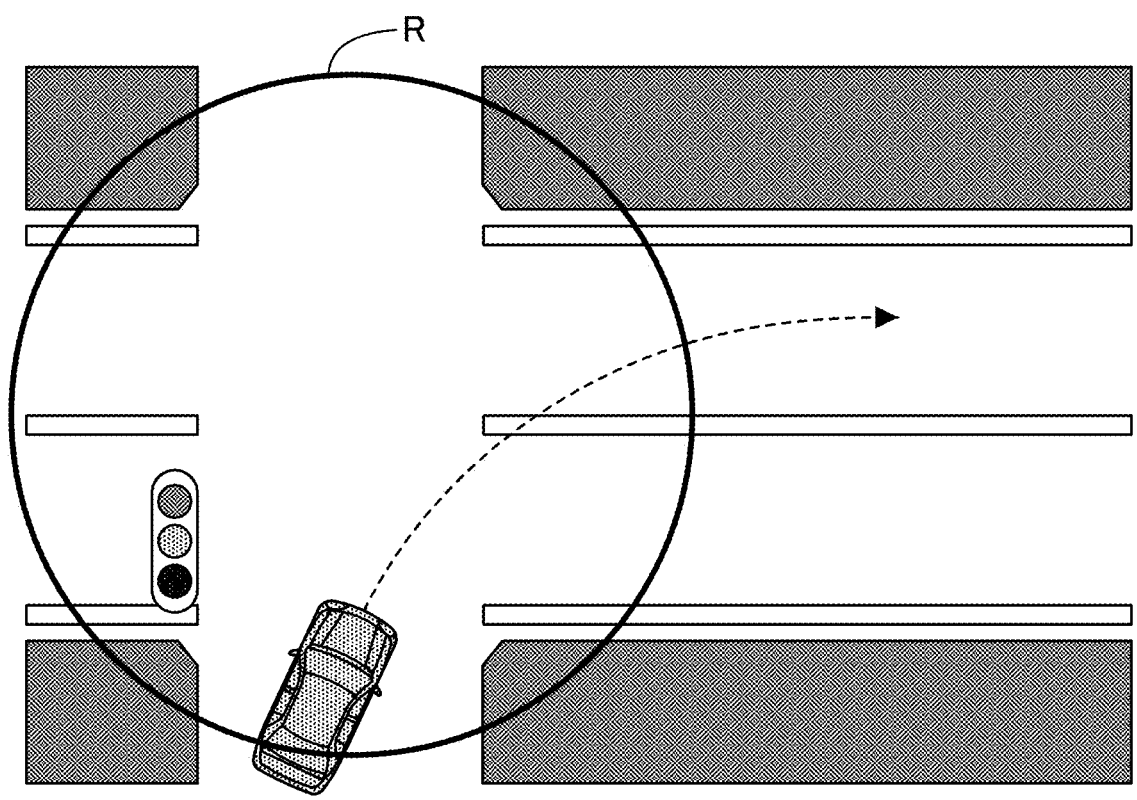
FIG. 8 is a plan view for illustrating a region R including an intersection and a vicinity thereof, which is a region in which there is a high possibility that a vehicle crosses a white line.

The driving support ECU 10 (ROM 10b) stores a plurality of pieces of region data RD each representing a predetermined region R including the intersection J (see FIG. 8). For example, the region data RD includes the latitude and longitude of the center of the intersection J and a radius. The ROM 10b may store only the region data RD for the intersection J that is selected as the intersection J having a statistically high possibility that vehicles cross the boundary line of the lane when turning right or left. The driving support ECU 10 determines, based on the information acquired from the navigation system 24, whether or not the own vehicle is positioned in the region R indicated by any of the region data RD. The driving support ECU 10 prohibits the execution of notification control and/or braking control in a situation in which the own vehicle is positioned in any region R.

Figure 9:
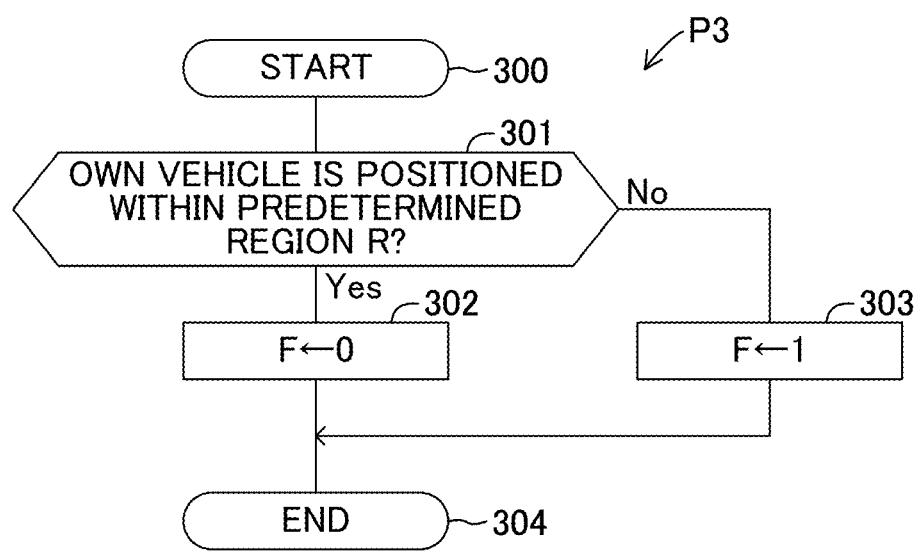
FIG. 9 is a flowchart of a program P3.

Next, with reference to FIG. 9, operation (a program P3 for implementing the above-mentioned cancel function) of the CPU is specifically described. The CPU executes the program P3 in place of the program P1 in the first embodiment.

(Program P3)

The CPU starts executing the program P3 from Step 300, and then advances the process to Step 301.

In Step 301, the CPU determines, based on the position information obtained from the in-vehicle sensors 20 (navigation system 24), whether or not the own vehicle is positioned within any region R.

When the own vehicle is positioned within any region R ("Yes" in Step 301), the CPU advances the process to Step 302. Meanwhile, when the own vehicle is not positioned within any region R ("No" in Step 301), the CPU advances the process to Step 303.

In Step 302, the CPU sets the control flag F to "0", and in Step 304, the CPU ends execution of the program P3.

In Step 303, the CPU sets the control flag F to "1", and then advances the process to Step 304.

(Effects)

In the third embodiment, in a situation in which the own vehicle is positioned within any region R (that is, at the intersection J or in the vicinity thereof), the CPU does not execute notification control and/or braking control (the control flag F is set to "0"). Thus, the driving support device 3 according to the third embodiment can prevent the execution of unrequired notification control and/or braking control in a situation in which there is a high possibility that the own vehicle is turning right or left. That is, the driving support device 3 according to the third embodiment is more practical than the related-art device.

Fourth Embodiment

Next, a driving support device 4 according to a fourth embodiment of the present disclosure is described. The driving support device 4 has the following cancel function in place of the cancel function in the first embodiment. Other configurations of the driving support device 4 are the same as those of the driving support device 1.

(Cancel Function)

The driving support ECU 10 (ROM 10*b*) stores a plurality of pieces of boundary line image motion data BMD each representing a change (hereinafter referred to as "boundary line image motion") in, for example, the position or direction of an image of a boundary line (hereinafter referred to as "boundary line image") of a lane within the angle of view of the camera 23 when the own vehicle is turning right or left at the intersection J. The driving support ECU 10 monitors a boundary line image motion BM based on the images acquired from the camera 23 during the travel of the own vehicle, and determines that "the own vehicle is turning right (or left)" when the boundary line image motion BM matches any of the boundary line image motion data BMD.

Figure 10A:
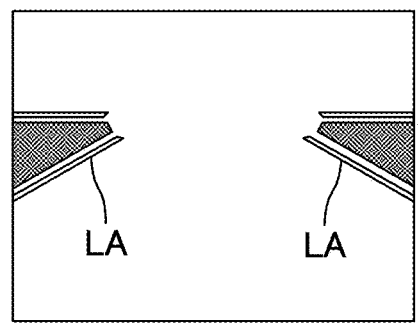
FIG. 10A is an example of an image for illustrating a foreground of the own vehicle at an initial stage when the own vehicle is turning right at an intersection.
Figure 10B:
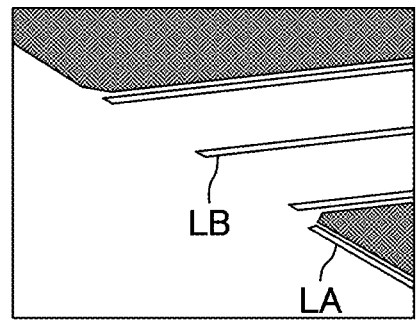
FIG. 10B is an example of an image for illustrating a foreground of the own vehicle at a stage in which the own vehicle has entered the intersection from the situation of FIG. 10A.

For example, when the own vehicle approaches the intersection J, as illustrated in FIG. 10A, boundary lines LA, LA of the lane La, in which the own vehicle has traveled up to that point, are interrupted in the upper half of the angle of view of the camera 23. Then, when the own vehicle starts to turn right, as illustrated in FIG. 10B, a boundary line LB of the lane Lb starts to enter near the upper right of the angle of view of the camera 23.

At the design stage of the driving support device 4, changes in, for example, the position or direction of the boundary line image when the own vehicle is turning right or left at each intersection are extracted based on foreground images of a test vehicle photographed by the camera 23 of the test vehicle. The extraction results are stored in the ROM 10*b* as the boundary line image motion data BMD. The ROM 10*b* stores a plurality of types of the boundary line image motion data BMD corresponding to configurations of intersections (for example, the road width, and the presence/absence of right-turn lane and left-turn lane).

The driving support ECU 10 extracts time-series data representing changes in, for example, the position or direction of a boundary line from the foreground images photographed by the camera 23 during the travel of the own vehicle, and compares the most recent portion (boundary line image motion BM) of the time-series data and the boundary line image motion data BMD. That is, the driving support ECU 10 executes pattern matching between the boundary line image motion BM acquired during the travel and the boundary line image motion data BMD. Then, when the degree of similarity between the two exceeds a predetermined threshold value, the driving support ECU 10 prohibits the execution of notification control and/or braking control.

Figure 11:
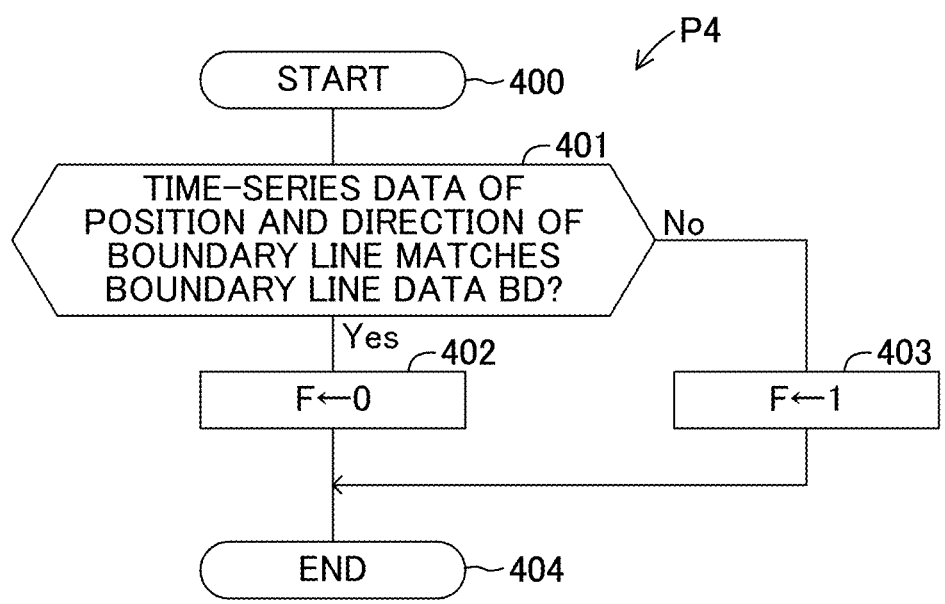
FIG. 11 is a flowchart of a program P4.

Next, with reference to FIG. 11, operation (a program P4 for implementing the above-mentioned cancel function) of the CPU is specifically described. The CPU executes the program P4 in place of the program P1 in the first embodiment.

(Program P4)

The CPU starts executing the program P4 from Step 400, and then advances the process to Step 401.

In Step 401, the CPU determines whether or not the boundary line image motion BM detected based on the image acquired from the camera 23 matches any of the boundary line image motion data BMD stored in the ROM 10*b*.

When the detected boundary line image motion BM matches any of the boundary line image motion data BMD ("Yes" in Step 401), the CPU advances the process to Step 402. Meanwhile, when the detected boundary line image motion BM does not match any of the boundary line image motion data BMD ("No" in Step 401), the CPU advances the process to Step 403.

In Step 402, the CPU sets the control flag F to "0", and in Step 404, the CPU ends execution of the program P4.

In Step 403, the CPU sets the control flag F to "1", and then advances the process to Step 404.

(Effects)

In the fourth embodiment, the CPU recognizes whether or not the own vehicle is turning right or left based on a change pattern BP in the position and direction of the detected boundary line. In a situation in which the own vehicle is turning right or left (special situation), the CPU does not execute notification control and/or braking control (the control flag F is set to "0"). Thus, the driving support device 4 according to the fourth embodiment can prevent the execution of unrequired notification control and/or braking control in the situation in which the own vehicle is turning right or left. That is, the driving support device 4 according to the fourth embodiment is more practical than the related-art device.

The present disclosure is not limited to the at least one embodiment described above, and various modification examples can be adopted within the scope of the present disclosure as described below.

MODIFICATION EXAMPLES

For example, in the first embodiment, the time T for which the angle θ has continuously been equal to or less than the threshold value θth is measured, but instead, a distance for which the own vehicle has traveled under a state in which the angle θ has been equal to or less than the threshold value θth may be measured. In this case, the execution of the notification control and/or braking control may be prohibited when the distance is less than a threshold value.

Further, in the first embodiment, the time T is initialized at the point in time when the boundary line becomes unrecognizable. After that, when the boundary line is recognized again and the angle θ is less than the threshold value θth, the measurement of the time T is restarted. Instead of this configuration, the measurement of the time T may be restarted from the point in time when the boundary line is recognized again.

Further, of the cancel functions in the first to fourth embodiments, one of the cancel functions may be selectively used. Moreover, a plurality of cancel functions may be simultaneously used. That is, for example, the CPU may simultaneously execute a plurality of programs among the programs P1 to P4.

The vehicle V may be an autonomous vehicle.

What is claimed is:

1. A driving support device, comprising:
    an in-vehicle sensor configured to acquire and output each of position information relating to a position of an own vehicle, target information relating to a target positioned around the own vehicle, and operation information relating to an operation of an operating element of the own vehicle; and
    an electronic control unit that includes a lane departure prevention function that is configured to prevent the own vehicle from departing from a lane in which the own vehicle is traveling by activating at least one device among a notification device, a drive device, and a braking device mounted on the own vehicle in a situation in which an accelerator pedal of the own vehicle is erroneously operated and an angle between a traveling direction of the own vehicle and a boundary line of the lane detected based on the target information is equal to or less than a predetermined threshold value, the electronic control unit being configured to disable the lane departure prevention function in a special situation,
    wherein the special situation is a situation in which the own vehicle enters, from a first lane in which the own vehicle has traveled, a second lane intersecting the first lane, and in which one of a time or a distance for which the own vehicle has traveled in a current lane since start of traveling in the current lane by the own vehicle is less than a predetermined threshold value, and
    wherein the erroneous operation is based on a depression depth of the accelerator pedal.

2. The driving support device according to claim 1, wherein the electronic control unit is configured to calculate one of the distance or the time for which the own vehicle has traveled along the lane in one of a situation in which the boundary line of the lane is continuous or a situation in which the boundary line is regarded as being continuous, and to initialize one of the distance or the time for which the own vehicle has traveled along the lane in a situation in which the boundary line is interrupted.

3. The driving support device according to claim 1, wherein the special situation is a situation in which a mode of a driving operation of a driver matches a predetermined mode.

4. The driving support device according to claim 3, wherein the special situation is a situation in which the mode of the driving operation of the driver matches a mode defined in advance as a mode of the driving operation when the own vehicle is turning right or left at an intersection.

5. The driving support device according to claim 1, wherein the special situation is a situation in which the own vehicle is positioned in a predetermined region.

6. The driving support device according to claim 5, wherein the special situation is a situation in which the own vehicle is positioned in the predetermined region in which a distance from a center of a predetermined intersection is equal to or less than a predetermined value.

7. The driving support device according to claim 1, wherein the special situation is a situation in which the electronic control unit is configured to recognize that the own vehicle is turning right or left based on the target information.

* * * * *